Feb. 24, 1925.

H. H. ROOT

HONEY EXTRACTOR

Filed Aug. 5, 1920

1,527,331

Inventor
Huber H. Root,
by Chas. J. Williamson
Attorney

Patented Feb. 24, 1925.

1,527,331

UNITED STATES PATENT OFFICE.

HUBER H. ROOT, OF MEDINA, OHIO, ASSIGNOR TO THE A. I. ROOT COMPANY, OF MEDINA, OHIO, A CORPORATION OF OHIO.

HONEY EXTRACTOR.

Application filed August 5, 1920. Serial No. 401,438.

*To all whom it may concern:*

Be it known that I, HUBER H. ROOT, a citizen of the United States, residing at Medina, in the county of Medina and State of Ohio, have invented certain new and useful Improvements in Honey Extractors, of which the following is a specification, reference being had therein to the accompanying drawing.

My invention relates to centrifugal extractors, and my object generally and briefly stated, is to provide a thoroughly practical extractor of the type in which comb-holding pockets revolve always on their own axes in presenting two sides of the comb, in succession, outermost so that the honey will be thrown outward therefrom by centrifugal force as the pockets revolve in an orbital path. My invention, therefore, consists in the honey extractor substantially as hereinafter specified, and with such characteristics of construction as are set forth in, or defined by, the appended claims.

I show in the drawing what, at this time, I regard as the best embodiment of my invention, but without limiting myself only to that embodiment, and in such drawings, Figure 1 is a top plan view, with parts broken away and with the can or container shown in dotted lines;

Figure 1:
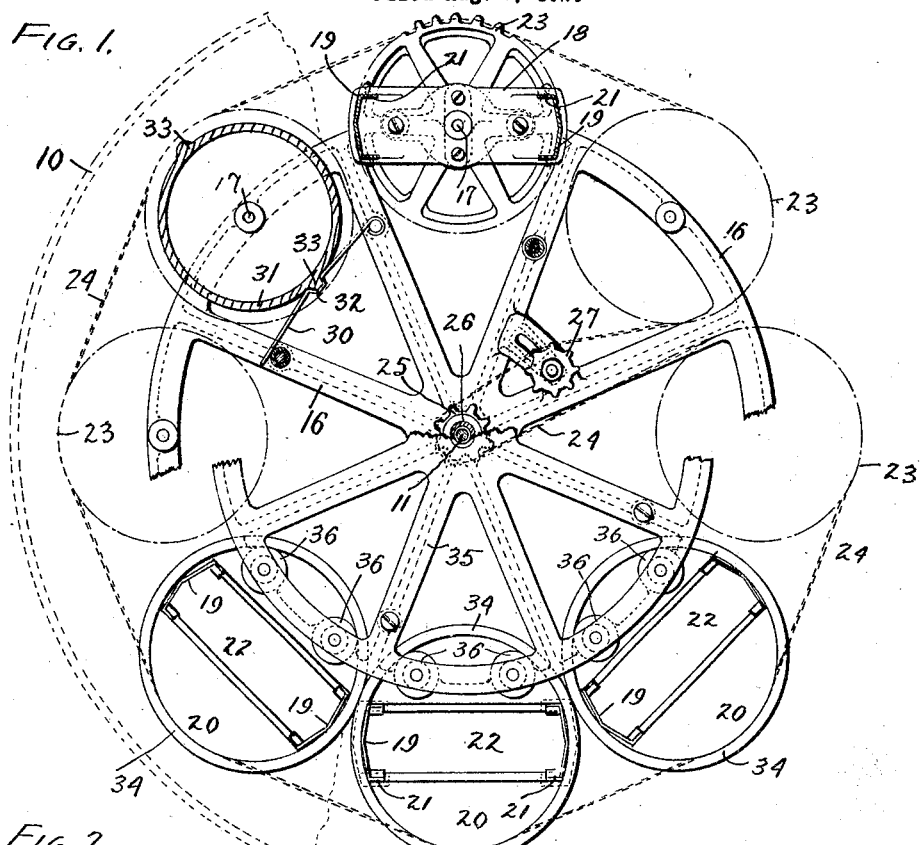
Figure 2:
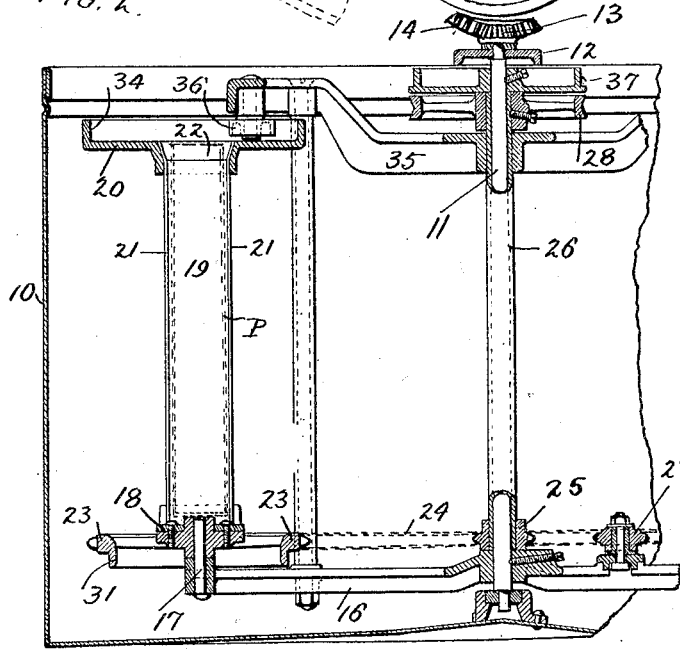
Figure 2 is a view in a vertical section, of a portion of the machine.
Figure 3:
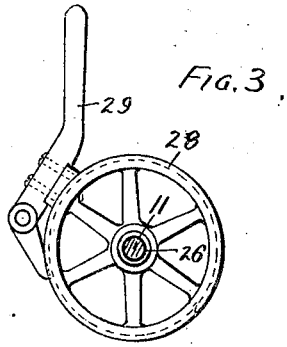
Figure 3 is a detail plan view of the means for causing the comb frames to rotate on their axes.

As is common in honey extractors, I employ a cylindrical can or container, 10, having at its center, a vertical shaft, 11, supported by suitable bearings at the top and bottom, in which it may turn freely, the top bearing being in a horizontal cross bar, 12, that extends diametrically across the top of the can, above which is a bevel pinion, 13, with which meshes a bevel gear, 14, on a horizontal driving shaft, not shown. Secured centrally to the vertical shaft, 11, at its lower end, and turning with it, is an open circular frame, or spider 16, which, at equi-distant points journals several vertical shafts 17, to the upper end of each of which is fixed the lower end of an oblong comb-pocket holding frame composed of a bottom bar 18 and side bars 19 and a horizontal disk 20 that is connected to the top ends of the side bars. The side bars have inwardly projecting flanges 21, so that they are channel-shape, and the disk 20 has a diametrically extending, oblong slot 22 that registers with the space between the side bars, so that the customary pocket, P (dotted lines, Figure 2) may be easily inserted and removed, as for cleaning or sterilizing.

Between the bottom bar, 18, of each frame and the spider 16, a sprocket wheel 23, is fixed to the frame shaft 17, and a sprocket chain 24 passes over all said sprockets and over a sprocket pinion, 25, fixed to the lower end of a tubular shaft, 26, which passes over the reel shaft, 11, which normally is free to turn, but which when temporarily held from turning while the revolution of the spider continues, will cause the revolution of each comb-holding frame on its axis. An idler, 27, is provided over which the chain passes, and which is adjustable to adjust the tension of the chain. The shaft 26 may be so held from turning by a friction brake of familiar form, comprising a wheel or drum, 28, fixed to the shaft and a stop lever 29 movable into contact with its periphery. It is desired that each comb-pocket shall make but half a revolution at a time, for the purpose of the turn is to place the opposite sides of the honey comb outermost, in succession. For this purpose, I use an automatic stop device. Said stop device is simply a spring blade, 30, fastened at one end to the spider with its other end free and pressing yieldingly against the periphery of a flange, 31, below the sprocket wheel 23, and provided with a recess 32 formed by a bend that is adapted to interlock with diametrically opposite lugs, 33, on the flange 31. On the sudden stoppage of rotation the sprocket pinion 25 and the wheel flange 31 will revolve and the engaged lug will ride out of the recess which, on a half turn of the flange 31, will engage the other lug. As the revolution of the wheel flange, 31, after the disengagement of the first lug slows down there will be no such momentum of the rotating parts as to prevent the locking engagement described between the second lug and the spring blade. This stop device is, therefore, extremely simple and yet thoroughly efficient. It may be applied to any number of the comb pocket wheels 23.

The comb pocket frames are pivoted on the bottoms by the short shaft 17, in each case. To support them at the top, I provide disks, 20, each with an upstanding peripheral, annular flange or rim, 34, and engage the rims on their inner periphery, and toward the reel center, with depending members on a circular, open frame or spider, 35, that is fixed to the tubular shaft 26, so that the centrifugal tendency of the comb pocket frames, or the top thereof, due to their revolution with the reel shaft, is sturdily opposed. Preferably, to reduce friction, said depending members are rollers 36, and preferably a spaced pair for each rim so that a good wide bearing is afforded. Said rollers are located at points within the innermost sides of the comb pockets, when in normal position, so that no obstruction exists to the free insertion or removal of the comb pockets through the disk slots 22. Each frame is thus supported independently of another and the supporting means is simple, strong, durable, and not easily put out of order.

The mechanism for causing and controlling the half revolution of the pocket frames is reduced to the smallest possible number of sprocket wheels, and involves the use of no other gears than sprocket gears.

For stopping the revolution of the reel, a common form of brake device is used that includes a friction disk 37 fixed to the reel shaft 11, and a strap (or band) not shown, that engages its periphery.

I claim:—

1. In a centrifugal extractor, the combination of a rotatable, circular series of comb holders, a shaft by which the series is rotated, a concentric shaft, a gear connection between the latter and the several comb holders, a frame fixed to the last-named shaft, and members carried by such frame that engage said comb holders and restrain them from centrifugal movement.

2. In a centrifugal extractor, the combination of a rotatable, circular series of comb holders, a shaft by which the series is rotated, a concentric shaft, a gear connection between the latter and the several comb holders, a frame fixed to said last-named shaft; annular rims carried by said holders, and rollers depending from said frame and engaging the interior of said rims.

3. In a centrifugal extractor, the combination of a rotatable series of rotatable comb holders, a shaft, a support fixed to the shaft, on which said holders are mounted, a sprocket wheel on each comb holder, a tubular shaft through which the other shaft passes and mounted to rotate therewith, means temporarily to stop such rotation, a sprocket pinion on said tubular shaft, and a chain running over the sprocket wheels and said pinion.

4. In a centrifugal extractor, the combination of a rotatable series of rotatable comb holders, a shaft, a support fixed to the shaft on which said holders are mounted, an annular member on each holder, a spring blade attached to said support, and a co-acting lug and recess on spring and annular member.

In testimony whereof I hereunto affix my signature.

HUBER H. ROOT.